Oct. 23, 1956   D. G. FISHER   2,767,503
FISHING LURE
Filed May 17, 1952
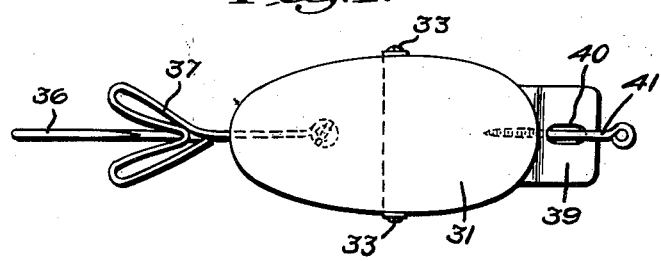
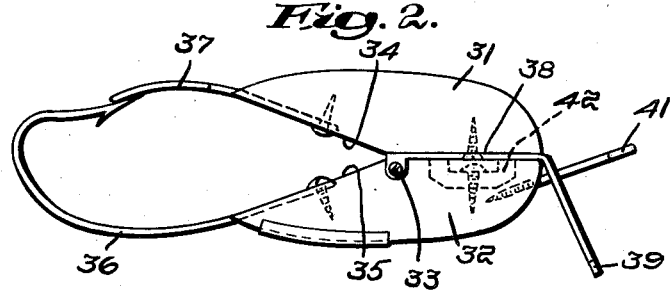
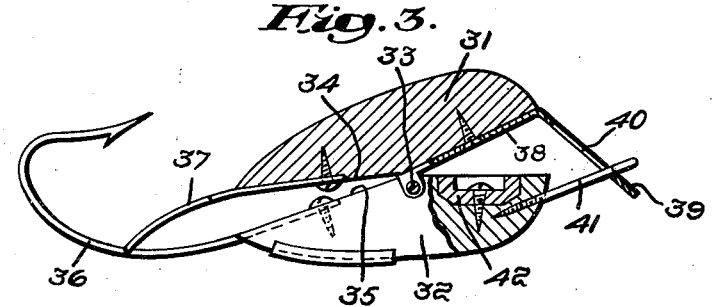
Inventor:
Donald G. Fisher,
by Abbott Spear
Attorney

2,767,503
FISHING LURE

Donald G. Fisher, Petersham, Mass.

Application May 17, 1952, Serial No. 288,468

1 Claim. (Cl. 43—42.43)

This invention relates to fishing lures and particularly to fishing lures consisting of at least two elements connected together for movement relative to one another with such movement being controlled in part by a permanent magnet.

In general, the effectiveness of a lure is dependent on its action as it travels through the water. While its action is controlled in part by the fisherman, many lures are so constructed as to ensure some action. Other lures have guards to shield the barbs of their hooks to render them weedless for the fouling of a hook with weeds not only interferes with the action of the lure but also renders it ineffective.

The general objective of the invention is to provide a lure having two relatively movable elements with at least one permanent magnet yieldably holding those elements in a predetermined position. Many different types of lures may be made in accordance with the invention and the nature of the elements varies accordingly. For example, the elements may be a hook and its guard, a lure body and a fin, or two parts of a lure body.

The invention thus makes possible lures that are weedless with the magnet offering insufficient resistance to the exposure of the hook, in response to a strike, to interfere therewith and thus eliminates the objection to weedless lures using guards of resilient stock that the resistance of the guards frequently in the cause of missed strikes. The invention also makes possible lures having an effective side-to-side or up-and-down course as they travel through the water.

While the general objectives and the novel features and advantages of the invention will be apparent from the foregoing, illustrative embodiments of the invention are shown in the accompanying drawings to enable them to be more readily and fully appreciated.

In the drawings:

Fig. 1 is a top plan view of another embodiment of the invention,

Fig. 2 is a side view of the lure shown in Fig. 1 with the body parts in a first predetermined position relative to each other, and Fig. 3 is a partly sectioned view, similar to Fig. 2, but with the body parts in a second predetermined position relative to each other.

With reference to the embodiment of the invention shown in the drawings, it will be noted that the body consists of an upper part 31 and a lower part 32 pivotally interconnected between their ends as at 33. Rearwardly of the pivotal interconnection 33, the proximate faces of the body parts 31 and 32 are rearwardly and outwardly inclined as indicated at 34 and 35, respectively, to enable the body parts to be pivoted between the first position shown in Fig. 2 and the second position shown in Fig. 3.

A hook 36 is anchored to the face 35 while a forked guard 37 is attached to the face 34 to shield the hook 36 in said first position. The lower surface of the body part 31 forwardly of the pivotal interconnection 33 has a plate 38 of magnetic material terminating in a fin 39 having a slot 40 through which extends the eyed shank 41 anchored in the body part 32 and to which the line is to be attached.

The lower body part 32 has a permanent magnet 42 disposed to engage with the plate 38 thereby yieldably to hold the body parts in their first position but offering little resistance to relative movement between the body parts to establish their second position in which the hook 36 is fully exposed.

The lure just described is a satisfactory weedless lure combining with it a motion-imparting fin. It will be noted that the water pressure on the fin 39 is a force contributing to the maintenance of body parts in their first position.

From the foregoing, it will be appreciated that the invention makes possible lures of many different types in which motion between two relatively movable elements is controlled in part by a permanent magnet for a variety of purposes.

What I therefore claim and desire to secure by Letters Patent is:

In a fish lure, the combination of a body comprising a pair of sections, transverse pivot means interconnecting said sections between their ends, the proximate faces of said sections being disposed to enable said sections to be rocked between first and second positions, a hook carrier by one section, a guard carried by the other section and disposed to shield said hook in the first position of said sections, a fin carried by one section adjacent its front end and having a slot, a line connector carried by the front end of the other section and intersecting the plane of said fin and extending through the slot thereof, and a permanent magnet carried by one section, at least a part of said other section being of magnetic material, said magnet yieldably holding said sections in their first position.

References Cited in the file of this patent

UNITED STATES PATENTS

| | | |
|---|---|---|
| 1,069,093 | Faught | July 29, 1913 |
| 1,124,719 | Fischer | Jan. 12, 1915 |
| 2,235,331 | Pugh | Mar. 18, 1941 |
| 2,459,819 | Hoage | Jan. 25, 1949 |